(No Model.)

G. A. BRADFORD.
SAUCEPAN AND COVER.

No. 334,560. Patented Jan. 19, 1886.

WITNESSES:
Donn Twitchell.
C. Sedgwick.

INVENTOR:
G. A. Bradford
BY Munn & Co.
ATTORNEYS.

UNITED STATES PATENT OFFICE.

GEORGE A. BRADFORD, OF BERGEN POINT, NEW JERSEY.

SAUCEPAN AND COVER.

SPECIFICATION forming part of Letters Patent No. 334,560, dated January 19, 1886.

Application filed May 9, 1885. Serial No. 164,881. (No model.)

*To all whom it may concern:*

Be it known that I, GEORGE A. BRADFORD, of Bergen Point, in the county of Hudson and State of New Jersey, have invented certain new and useful Improvements in Saucepans and Covers, of which the following is a full, clear, and exact description.

This invention relates to saucepans and other like culinary vessels provided with a perforated main lid or cover generally made removable, and having a supplementary lid for closing or exposing the perforations in the latter, said perforations being on one side of the main lid near its edge and serving, when exposed by the opening of the supplementary lid and suitably tilting the utensil, to pour off the watery contents from the utensil without allowing the solid contents—such as vegetables, &c.—to escape.

My invention consists in the peculiar construction and arrangement of parts, as hereinafter fully described, and pointed out in the claim.

Figure 1:
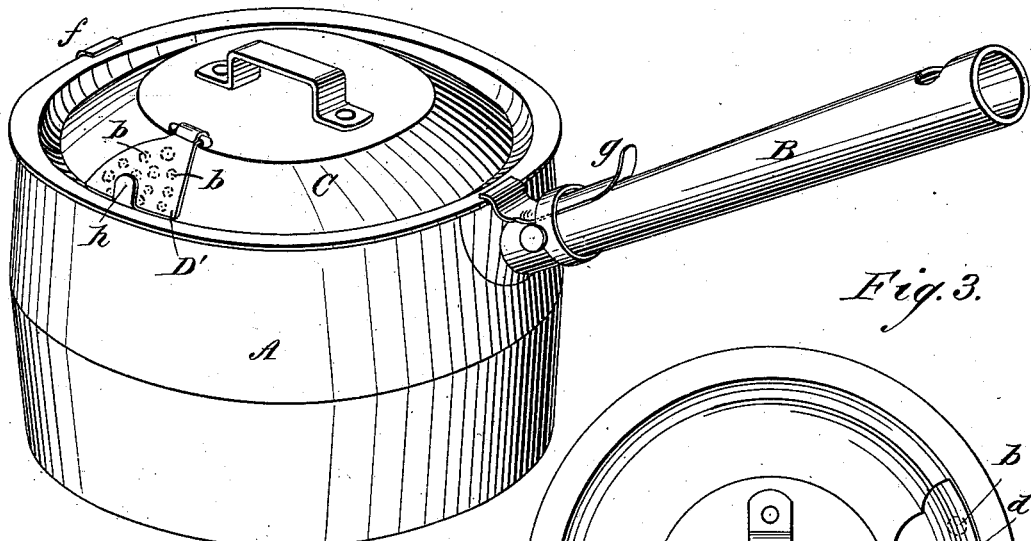
Figure 2:
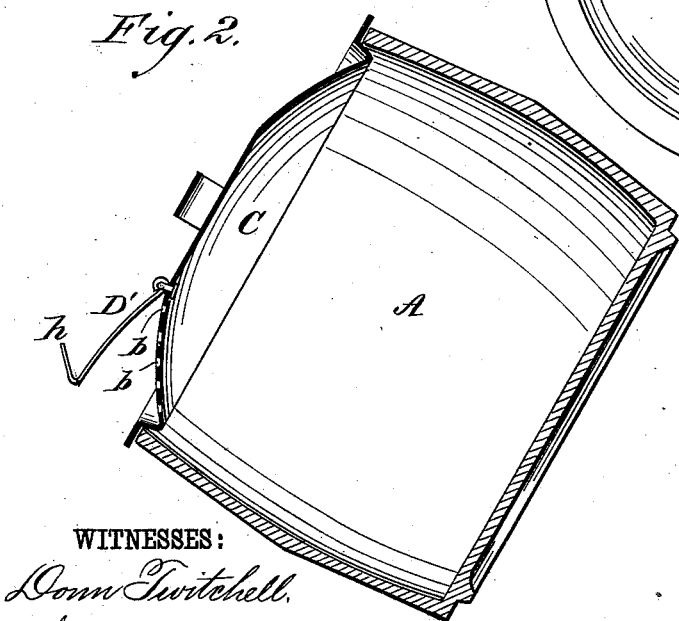

Reference being had to the accompanying drawings, Figure 1 represents a view in perspective of a saucepan provided with a perforated main and supplementary hinged close lid or cover, such as has before been used, but showing my improved means for holding the main lid to its place when tilting the saucepan. Fig. 2 is a sectional view representing the saucepan in the act of being tilted, and Fig. 3 is a plan view of a perforated main lid or cover adapted to such saucepan with my improved sliding supplementary perforated lid applied.

A indicates the body of the saucepan, B its handle, and C its main lid or cover of circular form, as usual, said lid having any number of draining-perforations, $b$, near one side of its margin. These perforations are closed or exposed, as required, by a supplementary lid on the main lid. In Fig. 1 said supplementary lid D' is of the kind ordinarily used in constructions of this description, it being a self opening and closing one, according to the upright or inclined position of the saucepan, as shown in Figs. 1 and 2, the same being hinged to the main lid and provided with a finger-piece, $h$, for raising it by hand when required. Instead of this hinged close supplementary lid I prefer to use a sliding one, D, Fig. 3, having perforations $d$ in it and capable of being adjusted on or over the main lid C to bring its perforations $d$ over or to one side of the perforations $b$ in the main lid, as by means of a button, $e$, the shank of which passes through a slot, $s$, in the main lid and is secured by a washer, $m$, underneath to hold the sliding lid D in contact with the main lid. By using this perforated sliding lid on the main lid there is no tendency of the lid to open when tilting the saucepan or carrying it about, and which it is frequently desirable to provide against, but it is only by specially adjusting the sliding lid before tilting the saucepan that the draining-apertures will be exposed to pour off the liquid contents of the saucepan; also the amount of exposure may be regulated as required by adjusting the slide to bring its apertures $d$ either wholly or only partly over the apertures $b$. This will be found convenient in cooking to provide for the escape of steam or to regulate the cooking of the contents of the saucepan. To obtain the full benefit, however, of the compound saucepan lid or cover fitted to the utensil so as to be capable of ready removal therefrom when required, and provided with draining perforations adapted to be opened and closed as needed, it is necessary that the main lid should be secured from falling off when tilting the saucepan to drain it of its liquid contents. Numerous means have been provided for this purpose, including cams, springs, inner projections on the lid, catches requiring the lid to be turned around, and duplicate lugs on the body to one side of its center. The means which I adopt, however, are as follows: Upon the one side of the top of the body A opposite the handle B is secured an exterior lip-shaped lid-retaining guide or clip, $f$, in which the marginal portion of the main lid C, when closed, fits, and is capable of being turned around. Within and upon the handle B is a slide or sliding clip, $g$, similarly constructed at its inner end to hold the main lid in place and to admit of the turning of the lid, if desired, but which may be slid back from engagement with the lid C when it is required to remove the lid. This adjustable locking device or clip $g$ acts in conjunction with the fixed clip $f$ to hold the main lid in place, and is capable of easy operation by the finger or thumb of the hand which grasps the handle B to put it into or out of engagement with the main lid. This fastening is not only convenient and easily applied and operated, but the adjustable and fixed clips being opposite one another the lid when locked by the sliding clip $g$, is very securely held in place, and the lid requires no special construction or placing on the saucepan to adapt it to them, nor the body of the saucepan any projecting flange or special construction to receive the lid, and the fastening is applicable to saucepan-lids of ordinary construction.

Figure 3:
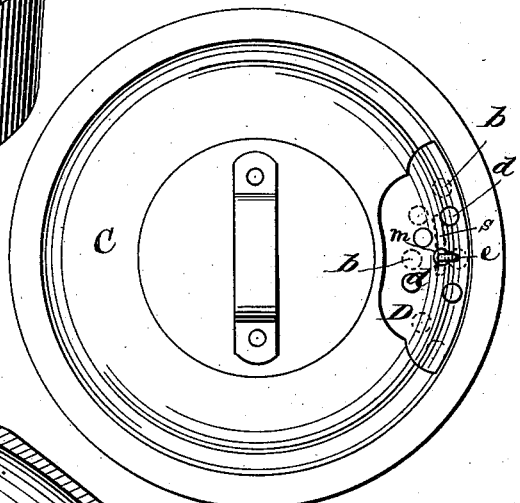

While the fastening for the lid is only shown in Fig. 1, it is evident that it is equally applicable to the form of lid shown in Fig. 3.

I claim—

The combination, with the loose or removable saucepan lid or cover having draining-perforations and provided with a supplementary lid controlling said perforations, the body A of the saucepan, and its handle B, of the sliding lid-locking clip $g$ on said handle, and the fixed clip $f$ on the side of the saucepan-body opposite the handle B, substantially as shown and described.

GEORGE A. BRADFORD.

Witnesses:
 ALBERT F. WOODWARD,
 ROBERT BEEMY, Jr.